US008722773B2

(12) United States Patent
Hamilton et al.

(10) Patent No.: US 8,722,773 B2
(45) Date of Patent: May 13, 2014

(54) POLYMERIC COMPOSITES

(75) Inventors: Robert T. Hamilton, Seattle, WA (US); Harshadkumar M. Shah, Bonney Lake, WA (US); Jeffrey Jacob Cernohous, Hudson, WI (US); Neil R. Granlund, Columbia Heights, MN (US); David E. Fish, Bellevue, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 70 days.

(21) Appl. No.: 13/170,075

(22) Filed: Jun. 27, 2011

(65) Prior Publication Data
US 2012/0208933 A1 Aug. 16, 2012

Related U.S. Application Data

(60) Provisional application No. 61/442,716, filed on Feb. 14, 2011.

(51) Int. Cl.
B29C 47/00 (2006.01)
B32B 23/00 (2006.01)

(52) U.S. Cl.
USPC .............................................. 524/13; 428/393

(58) Field of Classification Search
USPC .......................................................... 524/13
See application file for complete search history.

(56) References Cited

U.S. PATENT DOCUMENTS

| | | | |
|---|---|---|---|
| 4,125,493 A | 11/1978 | Posiviata et al. | |
| 5,288,772 A | 2/1994 | Hon | |
| 5,441,801 A | 8/1995 | Deaner et al. | |
| 5,518,677 A | 5/1996 | Deaner et al. | |
| 5,773,138 A | 6/1998 | Seethamraju et al. | |
| 5,827,607 A | 10/1998 | Deaner et al. | |
| 5,932,334 A | 8/1999 | Deaner et al. | |
| 5,948,524 A | 9/1999 | Seethamraju et al. | |
| 5,973,035 A | 10/1999 | Medoff et al. | |
| 5,981,067 A | 11/1999 | Seethamraju | |
| 6,004,668 A | 12/1999 | Deaner et al. | |
| 6,015,611 A | 1/2000 | Deaner et al. | |
| 6,015,612 A | 1/2000 | Deaner et al. | |
| 6,103,791 A | 8/2000 | Zehner | |
| 6,117,924 A | 9/2000 | Brandt | |
| 6,180,257 B1 | 1/2001 | Brandt et al. | |
| 6,207,729 B1 | 3/2001 | Medoff et al. | |
| 6,210,792 B1 | 4/2001 | Seethamraju et al. | |
| 6,258,876 B1 | 7/2001 | Medoff et al. | |
| 6,265,037 B1 | 7/2001 | Godavarti et al. | |
| 6,270,883 B1 | 8/2001 | Sears et al. | |
| 6,337,138 B1 | 1/2002 | Zehner et al. | |
| 6,344,504 B1 | 2/2002 | Zehner et al. | |
| 6,409,952 B1 | 6/2002 | Hacker et al. | |
| 6,448,307 B1 | 9/2002 | Medoff et al. | |
| 6,498,205 B1 | 12/2002 | Zehner | |
| 6,511,757 B1 | 1/2003 | Brandt et al. | |
| 6,565,348 B1 | 5/2003 | Snijder et al. | |
| 6,590,004 B1 | 7/2003 | Zehner | |
| 6,610,232 B2 | 8/2003 | Jacobsen | |
| 6,617,376 B2 | 9/2003 | Korney, Jr. | |
| 6,632,863 B2 | 10/2003 | Hutchison et al. | |
| 6,682,789 B2 | 1/2004 | Godavarti et al. | |
| 6,685,858 B2 | 2/2004 | Korney, Jr. | |
| 6,730,249 B2 | 5/2004 | Sears et al. | |
| 6,743,507 B2 * | 6/2004 | Barlow et al. | 428/393 |
| 6,780,359 B1 | 8/2004 | Zehner et al. | |
| 6,984,676 B1 | 1/2006 | Brandt | |
| 7,041,716 B2 | 5/2006 | Ton-That et al. | |
| 7,074,918 B2 | 7/2006 | Medoff | |
| 7,470,463 B2 | 12/2008 | Medoff | |
| 7,635,731 B2 * | 12/2009 | Sigworth et al. | 524/13 |
| 7,708,214 B2 | 5/2010 | Medoff | |
| 7,790,278 B2 | 9/2010 | Bell et al. | |
| 2003/0039833 A1 * | 2/2003 | Sen et al. | 428/373 |
| 2003/0096910 A1 * | 5/2003 | Soerens et al. | 525/191 |
| 2005/0225009 A1 | 10/2005 | Sain et al. | |
| 2006/0043629 A1 | 3/2006 | Drzal et al. | |
| 2008/0021135 A1 | 1/2008 | Garft et al. | |
| 2008/0261019 A1 | 10/2008 | Shen et al. | |
| 2009/0229771 A1 | 9/2009 | Warnes et al. | |

FOREIGN PATENT DOCUMENTS

CA 2350112 A1 12/2002
WO 9730838 A1 8/1997

OTHER PUBLICATIONS

Klason et al., Intern. J. Polymeric Mater., vol. 10, pp. 159-187, 1984.*
Le Baillif, Marie, et al.; Effect of the Preparation of Cellulose Pellets on the Dispersion of Cellulose Fibers into Polyrpopylene Matric During Extrusion, Journal of Applied Polymer Science, vol. 115, 2794-2805, 2009, Wiley Periodicals, Inc.
Clemens C., "Exploratory Microscopic Investigation of Impacted Paper Fiber-Reinforced Polypropylene Composites", Wood Plastic Composites symposium, May 1, 1995, pp. 173-179, Forest Products Society, Madison, WA, U.S.A.
Hans-Peter Fink, "Novel Thermoplastic Composites from Commodity Polymers and Man-Made Cellulose Fibers", Macromolecular Symposium, New Cellulose Products Composites, Wiesbaden, Germany, Jun. 26, 2006, pp. 106-113 and 116-119, vol. 244, Wiley InterScience, www.interscience.wiley.com.
Klason C. et al, "Cellulose in Polymeric Composites", Materials Science Monographs, 36, Composite Systems From Natural and Synthetic Polymers, 1986, pp. 65-74, Elsevier Science Publishers B.V., Amsterdam, The Netherlands.
Klason C. et al, "The Efficiency of Cellulosic Filers in Common Thermoplastics. Part 1. Filling without Processing Aids or Coupling Agents", International Journal of Polymeric Materials, Chalmers University of Technology, Dept. of Polymeric Materials, S-412 96, Gothenburg, Sweden, 1984, pp. 159-187, vol. 10, Gordon and Breach Science Publishers, Inc.
Dalvag H. et al, "The Efficiency of Cellulosic Fillers in Common Thermoplastics. Part II. Filling with Processing Aids and Coupling Agents", International Journal of Polymeric Materials, Chalmers University of Technology, Dept. of Polymeric Materials, S-412 96, Gothenburg, Sweden, 1985, pp. 9-38, vol. 11, Gordon and Breach Science Publishers, Inc. and OPA Ltd.

(Continued)

Primary Examiner — Hui Chin
(74) Attorney, Agent, or Firm — Timothy M. Whalen; Weyerhaeuser Law Dept

(57) ABSTRACT

A composition comprising 65 to 90 weight percent kraft chemical wood pulp fibers and a thermoplastic polymer and a method of making the composition.

11 Claims, 6 Drawing Sheets

(56) References Cited

OTHER PUBLICATIONS

Klason C. et al, "New Wood-Based Composites With Thermoplastics", Chalmers University of Technology, Dept. of Polymeric Materials, 5-412 96, Gothenburg, Sweden, Cellulosics Utilization, Research and Rewards in Cellulosics, Proceedings of Nisshinbo International Conference on Cellulosics Utilization in the Near Future, Dec. 5, 1988, pp. 86-97, Edited by H. Inagaki and G.O. Phillips, Elsevier Applied Science.

Boldizar A. et al, "Prehydrolyzed Cellulose as Reinforcing Filler for Thermoplastics", International Journal of Polymeric Materials, Department of Polymeric Materials, Chalmers University of Technology, S-412 96, Gothenburg, Sweden, 1987, pp. 229-262, vol. 11, Gordon and Breach Science Publishers, Inc.

Nystrom B, "Natural Fiber Composites, Optimization of Microstructure and Processing Parameters", Licentiate Thesis, Lulea University of Technology, Department of Applied Physics and Mechanical Engineering, Division of Polymer Engineering, 2007:31, ISSN: 1402-1757, ISSN: LTU-LIC-07/31-SE.

Le Baillif M et al, "The Effect of Processing on Fiber Dispersion, Fiber Length, and Thermal Degradation of Bleached Sulfite Cellulose Fiber Polypropylene Composites", Journal of Thermoplastic Composite Materials, Mar. 2009, pp. 115-133, vol. 22, SAGE Publications, Los Angeles, London, New Dehli and Singapore.

Johnson R et al, "Mechanical Properties of Wetlaid Lyocell and Hybrid Fiber-Based Composites with Polypropylene", Department of Wood Science and Forest Products, Virginia Polytechnic Institute and State University, 230 Cheatham Hall, Blacksburg, VA 24061-0323, USA, 2004, Abstract, pp. 1-34.

Sears K et al, "Reinforcement of Engineering Thermoplastics with High Purity Wood Cellulose Fibers", The Sixth International Conference on Woodfiber-Plastic Composites, May 15-16, 2001, Abstract, pp. 27-34.

\* cited by examiner

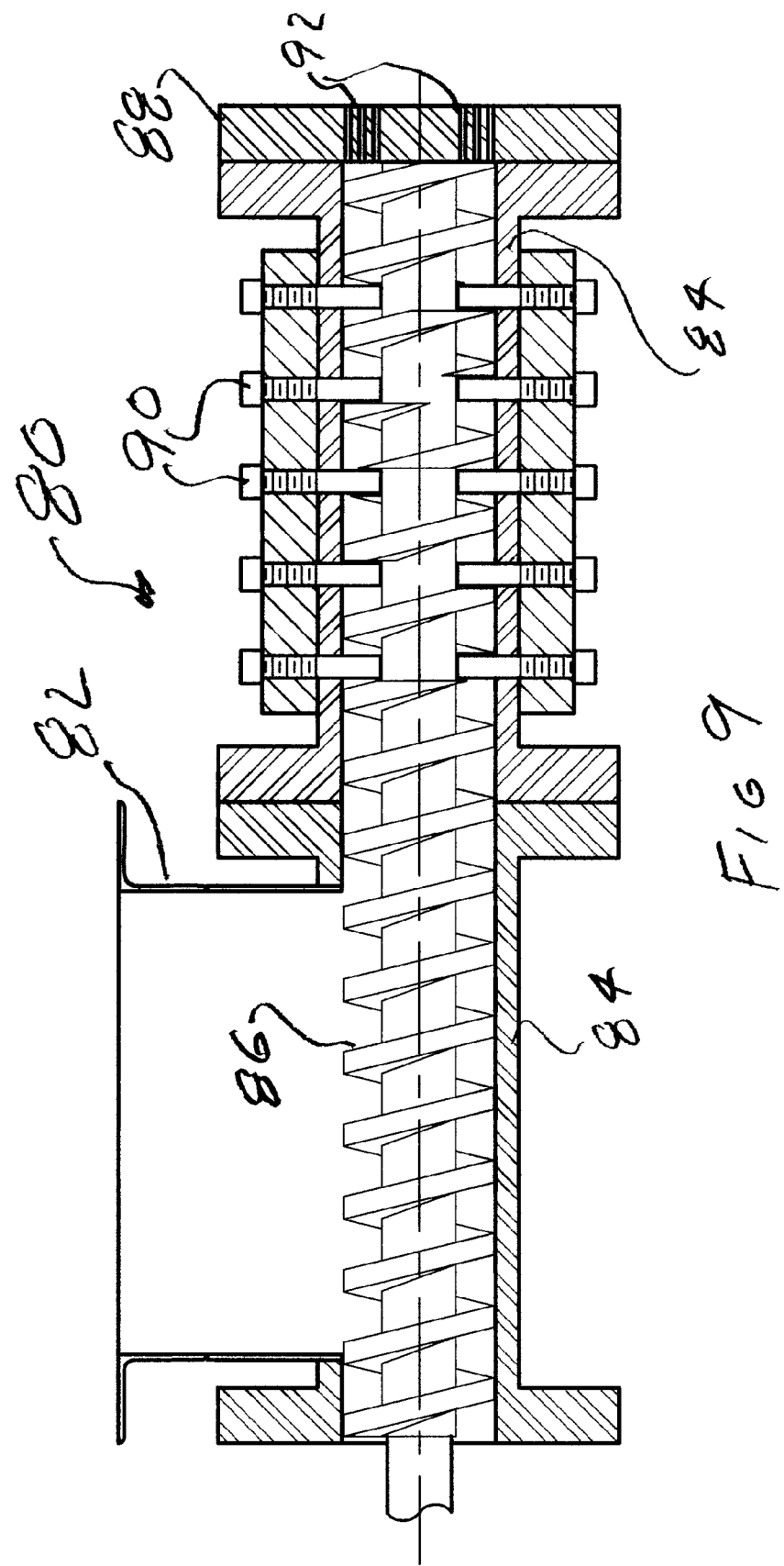

POLYMERIC COMPOSITES

CROSS-REFERENCE TO RELATED APPLICATION

This application is entitled to and claims the benefit of priority under 35 U.S.C. §119 from U.S. Provisional Patent Application Ser. No. 61/442,716 filed Feb. 14, 2011, and titled "Polymeric Composites," the contents of which are incorporated herein by reference.

FIELD OF THE INVENTION

The present invention relates to polymeric composites that are derived from melt processing a polymeric matrix with chemical wood pulp fiber.

BACKGROUND

In the molding of composite polymeric materials there are three steps. The first is the formation of a master batch material. The second is the compounding of the master batch material into a compound material. The third step is molding of the compound material into the final molded product. In some instances steps one and two may be combined.

BRIEF DESCRIPTION OF THE DRAWINGS

FIG. 9 is a diagram of a single screw extruder useful for manufacturing the present pellet.

DETAILED DESCRIPTION

Figure 1:
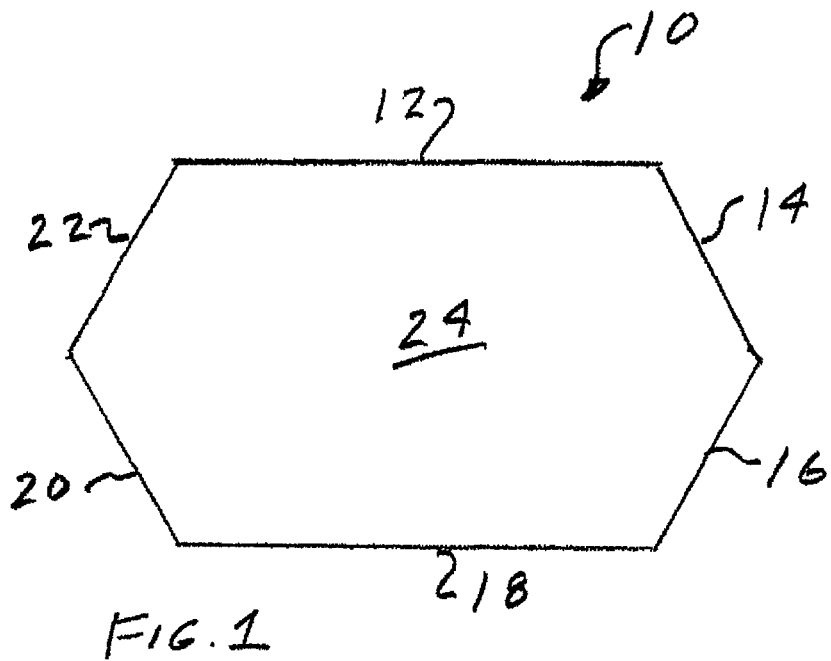
FIGS. 1-5 are diagrams of a pellet used to manufacture the polymeric composite

The present invention is directed at a solution to providing an economical means of producing composite polymeric materials which include 65 to 90 weight % chemical wood pulp fiber from a chemical wood pulp sheet. The composites of this invention have chemical wood pulp fibers uniformly dispersed within a polymeric matrix.

In one embodiment the chemical wood pulp fiber is a bleached chemical wood pulp fiber. There are reasons for using a bleached chemical wood pulp fiber instead of an unbleached wood pulp fiber.

One reason is color. A bleached chemical wood pulp fiber is substantially all cellulose and hemicellulose. Cellulose and hemicellulose have no native color so they will impart little or no color to a composite. On the other hand, unbleached fibers such as natural fibers like kenaf or whole wood fibers have up to 50% lignin and other compounds which can be colored in their native state or will become colored when heated to thermoplastic processing temperatures. A composite with unbleached, natural or whole wood fibers would become colored, probably a dark brown color.

Another reason is odor. Cellulose has no odor so a composite with bleached wood pulp fibers has very little odor contributed by the cellulose. Lignin and other components in unbleached fibers have strong characteristic odors when melt processed, imparting a strong odor to the resulting composite, limiting its use in enclosed areas such as the interior of an automobile There are problems associated with uniformly dispersing chemical wood pulp fibers throughout a polymer matrix. The fibers are initially in a dried pulp sheet. The drying collapses the pulp fibers. The drying also causes the pulp fibers to bond together through hydrogen bonds. The hydrogen bonds must be broken in order to obtain substantially individual fibers. Some of the fibers will remain bonded. These are called knots or knits depending on the size. There will usually be a few knots and knits remaining after breaking the hydrogen bonds between fibers.

There are also problems associated with providing the chemical wood pulp fiber at levels of 65 weight % or higher of the total weight of the fiber/polymer mix. The smaller amount of polymer means it is more difficult to disperse the fiber in the polymer matrix. The smaller amount of polymer means it is more difficult to disperse the fiber uniformly throughout the polymer matrix. The fiber/polymer mix becomes more viscous as the amount of fiber increases and it is therefore more difficult to move the fibers within the matrix to provide dispersion. The purpose is to have very few fiber clumps The problems to be solved are providing the fibers in a the polymer matrix in a substantially individual form and metering the fibers into the polymer in a substantially uniform amount so the wood pulp fiber/composite will have wood pulp fibers substantially uniformly dispersed throughout the composite. The present invention carries the diced particles of chemical wood pulp taken from the wood pulp sheet and meters them into the polymer and substantially\ singulates the wood pulp fibers while mixing the wood pulp with the polymer.

The polymeric matrix functions as the host polymer and is a component of the melt processable composition including the chemical wood pulp feedstock. Melt processing is use to combine the polymer and chemical wood pulp fiber. In melt processing the polymer is heated and melted and the chemical wood pulp fiber is combined with the polymer.

The polymer is thermoplastic.

A wide variety of polymers conventionally recognized in the art as suitable for melt processing are useful as the polymeric matrix. The polymeric matrix substantially includes polymers that are sometimes referred to as being difficult to melt process, especially when combined with an interfering element or another immiscible polymer. They include both hydrocarbon and non-hydrocarbon polymers. Examples of useful polymeric matrices include, but are not limited to high density polyethylene (HDPE), low density polyethylene (LDPE), linear low density polyethylene (LLDPE), polypropylene (PP)), polyolefin copolymers (e.g., ethylene-butene, ethylene-octene, ethylene vinyl alcohol), polystyrene, polystyrene copolymers (e.g., high impact polystyrene, acrylonitrile butadiene styrene copolymer), polyacrylates, polymethacrylates, polyesters, polyvinylchloride (PVC), fluoropolymers, Liquid Crystal Polymers, polyamides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters or combinations thereof. In certain embodiments, the most suitable polymeric matrices are polyolefins.

Polymeric matrices that are derived from recycled plastics are also applicable as they are often lower cost. However, because such materials are often derived from materials coming from multiple waste streams, they may have vastly different melt rheologies. This can make the material very problematic to process. The addition of cellulosic feedstock to a recycled polymer matrix should increase the melt viscosity and reduce overall variability, thus improving processing.

A partial list of plastic or polymeric materials which can utilize the cellulose wood pulp fibers can include polyolefins, polyethylene, polypropylene, polyvinyl chloride, ABS, polyamides, mixtures of these, polyethylene terephthalate, polybutylene terephthalate, polytrimethylterephthalate, ethylene-carbon monoxide and styrene copolymer blends such as styrene/acrylonitrile and styrene/maleic anhydride thermoplastic polymers, polyacetals, cellulose butyrate, acrylonitrile-butadiene-styrene, certain methyl methacrylates, and polychlorotrifluoroethylene polymers. A complete list of thermoset or thermoplastic material which can utilize cellulose wood pulp fiber is known to those skilled in the art.

In one embodiment, the chemical wood pulp feedstock is melt processed with an incompatible polymeric matrix (e.g., polyolefin). In another embodiment, the chemical wood pulp feedstock is melt processed with a compatible polymeric matrix (e.g., modified cellulosic polymers). For example, it has been found that when the chemical wood pulp feedstock of this invention is melt processed with cellulose propionate (Tenite™ 350E), the resulting composite has excellent fiber dispersion and mechanical properties.

The present invention also contemplates the use of coupling agents in the composite formulation. Coupling agents are typically used to improve interfacial wetting of fillers with a polymer matrix. Addition of coupling agents or compatibilizers often improves the mechanical properties of the resulting composite material. The present invention utilizes coupling agents to improve wetting between the chemical wood pulp fiber of this invention and the polymer matrix as is known conventionally. However, we have also found that addition of a coupling agent improves the melt processing and dispersion of the chemical wood pulp feedstock of this invention with some polymers.

Preferred coupling agents for use with polyolefins are polyolefin-graft-maleic anhydride copolymers. In one embodiment, the polymer matix and cellulosic feedstock is melt processed with a polyolefin-graft-maleic anhydride copolymer. Commercially available coupling agents of this invention include those sold under the tradenames Polybond™ (Chemtura), Exxelor™ (Exxon Mobil), Fusabond™ (DuPont), Lotader™ (Arkema), Bondyram™ (Maroon), Integrate (Equistar). The polymeric matrix may contain one or more fillers in addition to the chemical wood pulp feedstock. The polyolefin in the graft copolymer will be the same as the polyolefin used as the polymer in the polymer matrix. For example polyethylene-graft-maleic anhydride would be used with polyethylene and polypropylene-graft-maleic anhydride would be used with polypropylene.

In one embodiment, amounts of about 5-10%, and in another 0.2-5% of the coupling agent is incorporated into composite formulations and melt processable compositions.

Fillers and fibers other than chemical wood pulp fibers may be added to the fiber/polymer blend to impart desirable physical characteristics or to reduce the amount of polymer needed for a given application. Fillers often contain moisture and therefore reduce efficacy of a compatibilizer present in a polymeric matrix. Non-limiting examples of fillers and fibers include wood flour, natural fibers other than chemical wood pulp fiber, glass fiber, calcium carbonate, talc, silica, clay, magnesium hydroxide, and aluminum trihydroxide.

In another aspect of the invention, the melt processable composition may contain other additives. Non-limiting examples of conventional additives include antioxidants, light stabilizers, fibers, blowing agents, foaming additives, antiblocking agents, heat stabilizers, impact modifiers, biocides, flame retardants, plasticizers, tackifiers, colorants, processing aids, lubricants, compatibilizers, and pigments. The additives may be incorporated into the melt processable composition in the form of powders, pellets, granules, or in any other extrudable or compoundable form. The amount and type of conventional additives in the melt processable composition may vary depending upon the polymeric matrix and the desired physical properties of the finished composition. Those skilled in the art of melt processing are capable of selecting appropriate amounts and types of additives to match with a specific polymeric matrix in order to achieve desired physical properties of the finished material.

In one embodiment, the chemical wood pulp feedstock of this invention is produced by mechanically dicing a chemical wood pulp sheet material. In one embodiment, the chemical wood pulp feedstock is diced into a hexagonal shape that is conducive for use with conventional feeding equipment. In other embodiments the shapes may be triangular, rectangular or pentagon shaped particles. The composites of this invention are produced by melt processing a polymeric matrix with chemical wood pulp feedstock. In one embodiment, the chemical wood pulp feedstock is uniformly dispersed within the polymeric matrix after melt processing.

The present invention is directed at a solution to providing an economical means of producing composite materials which contain well dispersed chemical wood pulp fibers. This is achieved by utilizing a chemical wood pulp feedstock that has increased bulk density and is capable of being fed into melt processing equipment using conventional feeding technology. The composites of this invention have chemical wood pulp fibers well dispersed within a polymeric matrix.

The present invention can utilize a number of tree species as the source of the pulp, paperboard and paper fibers. Coniferous and broadleaf species and mixture of these can be used. These are also known as softwoods and hardwoods. Typical softwood species are various spruces (e.g., Sitka Spruce), fir (Douglas fir), various hemlocks (Western hemlock), tamarack, larch, various pines (Southern pine, White pine, and Caribbean pine), cypress and redwood or mixtures of same. Typical hardwood species are ash, aspen, cottonwood, basswood, birch, beech, chestnut, gum, elm, eucalyptus, maple oak, poplar, and sycamore or mixtures thereof.

The use of softwood or hardwood species may depend in part on the fiber length desired. Hardwood or broadleaf species have a fiber length of 1-2 mm. Softwood or coniferous species have a fiber length of 3.5 to 7 mm. Douglas fir, grand fir, western hemlock, western larch, and southern pine have fiber lengths in the 4 to 6 mm range. Pulping and bleaching and dicing may reduce the average length slightly because of fiber breakage.

In the manufacture of pulp woody material is disintegrated into fibers in a chemical pulping process. The fibers can then optionally be bleached. The fibers are then combined with water in a stock chest to form a slurry. The slurry then passes to a headbox and is then placed on a wire, dewatered and dried to form a pulp sheet. Additives may be combined with the fibers in the stock chest, the headbox or both. Materials may also be sprayed on the pulp sheet before, during or after dewatering and drying. The kraft pulping process is typically used in the manufacture of wood pulp.

Cellulosic wood pulp fibers can be in the form of commercial cellulosic wood pulps. The material is typically delivered in roll or baled form. The thickness of the pulp sheet is one factor that can determine the thickness of the particle. The pulp sheet has two opposed substantially parallel faces and the distance between these faces will be the thickness of the particle. A typical pulp sheet can be from 0.1 mm to 4 mm thick. In some embodiments the thickness may be from 0.5 mm to 4 mm. One of the other factors affecting the particle thickness is the presence of any pretreatment to the fiber sheet. Thus the particle can be thicker or thinner than the fiber sheet.

The fiber sheet, and the particles, can have a basis weight of from 12 g/m² (gsm) to 2000 g/m². In one embodiment the particles could have a basis weight of 600 g/m² to 1900 g/m². In another embodiment the particles could have a basis weight of 500 g/m² to 900 g/m². For a paper sheet one embodiment could have a basis weight of 70 gsm to 120 gsm. In another embodiment a paperboard could have a basis weight of 100 gsm to 350 gsm. In another embodiment a fiber sheet for specialty use could have a basis weight of 350 gsm to 500 gsm.

Pulp additives or pretreatment may also change the character of the particle. A pulp that is treated with debonders will provide a looser particle than a pulp that does not have debonders. A looser particle may disperse more readily in the material with which it is being combined.

The particle has a hexagonal shape, one embodiment of which is shown in FIG. 1. The hexagon can be of any type from fully equilateral to fully asymmetric. If it is not equilateral, the major axis may be from 4 to 8 millimeters (mm) and the minor axis may be from 2 to 5 mm. Some of the sides of the hexagon may be of the same length and some or all of the sides may be of different lengths. The circumference or perimeter of the hexagon may be from 12 mm to 30 mm and the area of the upper or lower face 24 or 26 of the particle may be from 12 to 32 mm². In one embodiment the particles could have a thickness of 0.1 to 1.5 mm, a length of 4.5 to 6.5 mm, a width of 3 to 4 mm and an area on one face of 15 to 20 mm². In another embodiment the particles could have a thickness of 1 to 4 mm, a length of 5 to 8 mm, a width of 2.5 to 5 mm and an area on one face of 12 to 20 mm².

Two examples of a hexagonally shaped particle are shown.

Figure 2:
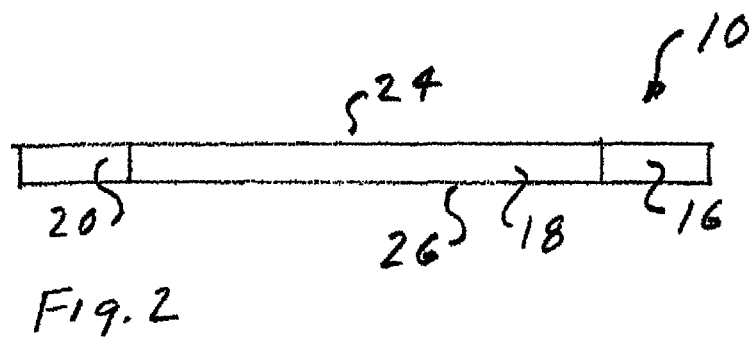
Figure 3:
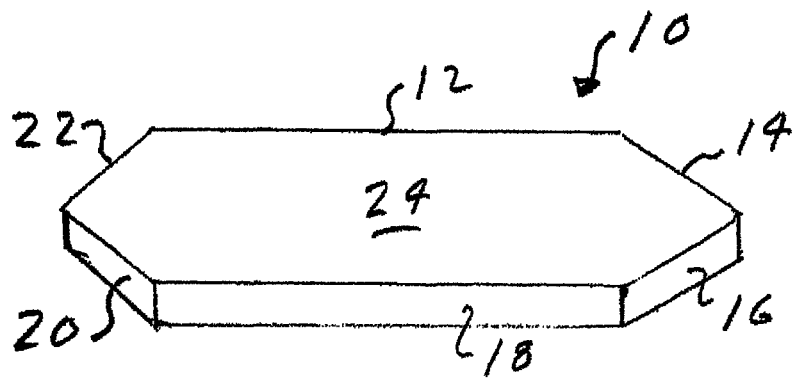

In FIGS. 1-3, particle 10 is hexagon shaped and has two opposed sides 12 and 18 which are equal in length and are longer than the other four sides 14, 16, 20 and 22. The other four sides 14, 16, 20 and 22 may be the same length, as shown, or the four sides may be different lengths. Two of the sides, one at each end such as 14 and 20 or 14 and 22 may be the same length, and the other two at each end, 16 and 22 or 16 and 20, may be the same length or have different lengths. In each of these variations, the sides 10 and 18 may the same length or of different lengths. The edges of the particles may be sharp or rounded.

The distance between the top 24 and bottom 26 of particle 10 may be from 0.1 mm to 4 mm.

Figure 4:
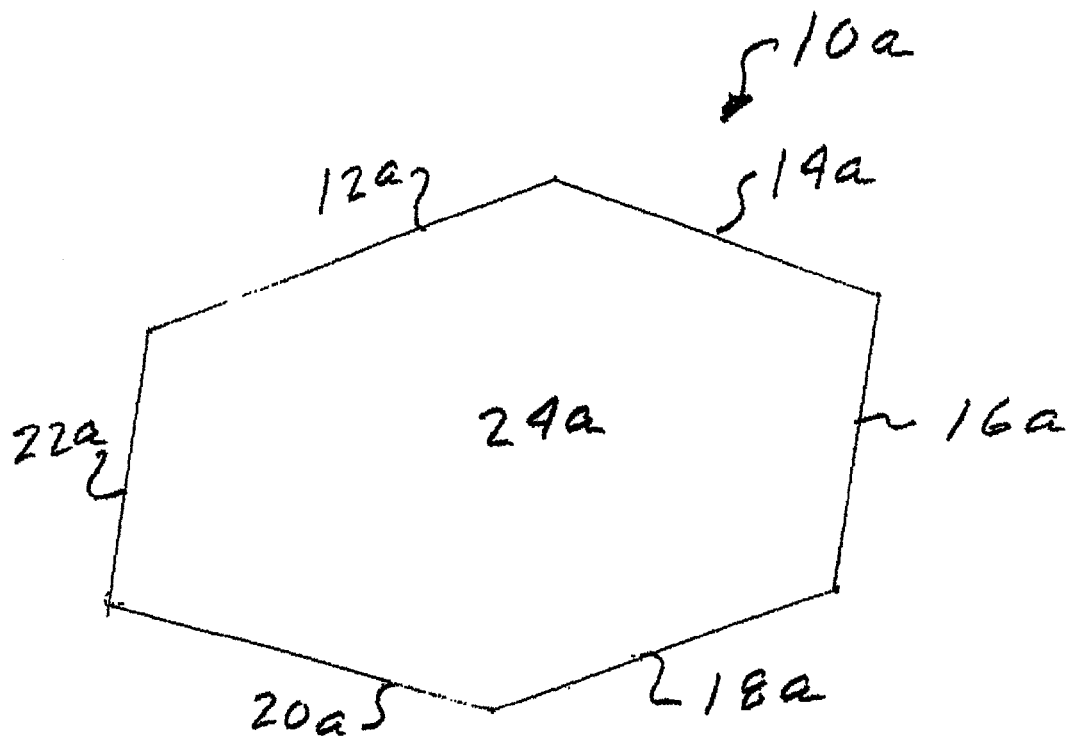
Figure 5:
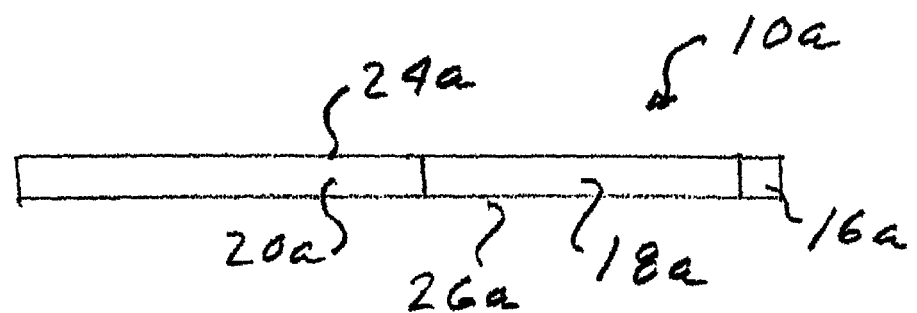

FIGS. 4 and 5 illustrate an embodiment in which each of the six sides the hexagon is of a different length. The embodiment shown is illustrative and the order of the lengths of the sides and size of the lengths of the sides can vary.

Particles of the shape, size and basis weight described above can be metered in weight loss and volumetric feeder systems well known in the art.

The alignment of the fibers within the particle can be parallel to the major axis of the hexagon or perpendicular to the major axis of the hexagon or any orientation in between.

The hexagonal particles can be formed on a Henion dicer, but other means could be used to produce a hexagonal particle.

The hydrogen bonded cellulose wood pulp fibers are then dispersed in the polymer. One method is to make a master batch which is fiber rich having 65 to 85 weight % of cellulose wood pulp fiber and 15 to 35 weight % polymer. Part of the polymer can be a compatibilizer if one is needed. This material would then be compounded at the same location or a different location to reduce the amount of cellulose wood pulp fiber and increase the amount of polymer. Other additives and fillers may be added to the material in the compounding operation. The compounded material would then be molded.

The initial addition of the cellulose pulp fiber to the polymer is a two step operation.

In the first step the hexagon pellets are combined and mixed with the polymer in a mixing operation. The mixing can occur in a thermokinetic mixer or a Gelimat mixer, The amount of chemical cellulose wood pulp fiber in the material is 65 to 85 weight % and the amount of polymer is 15 to 35 weight %. If a compatibilizer is used then the amount of polymer will be reduced by the amount of compatibilizer. If 5 weight % compatibilizer is used then the amount of polymer will be reduced by 5 weight %. Nonpolar polymer, such as olefins, would use a compatibilizer. Typical compatibilizers are graft copolymers such as maleic anhydride polypropylene or maleic anhydride polyethylene. If polypropylene is the polymer then up to 0.5 weight % antioxidant will also be used. The fiber and polymer will exit the thermokinetic mixer as a fluffy material.

Figure 6:
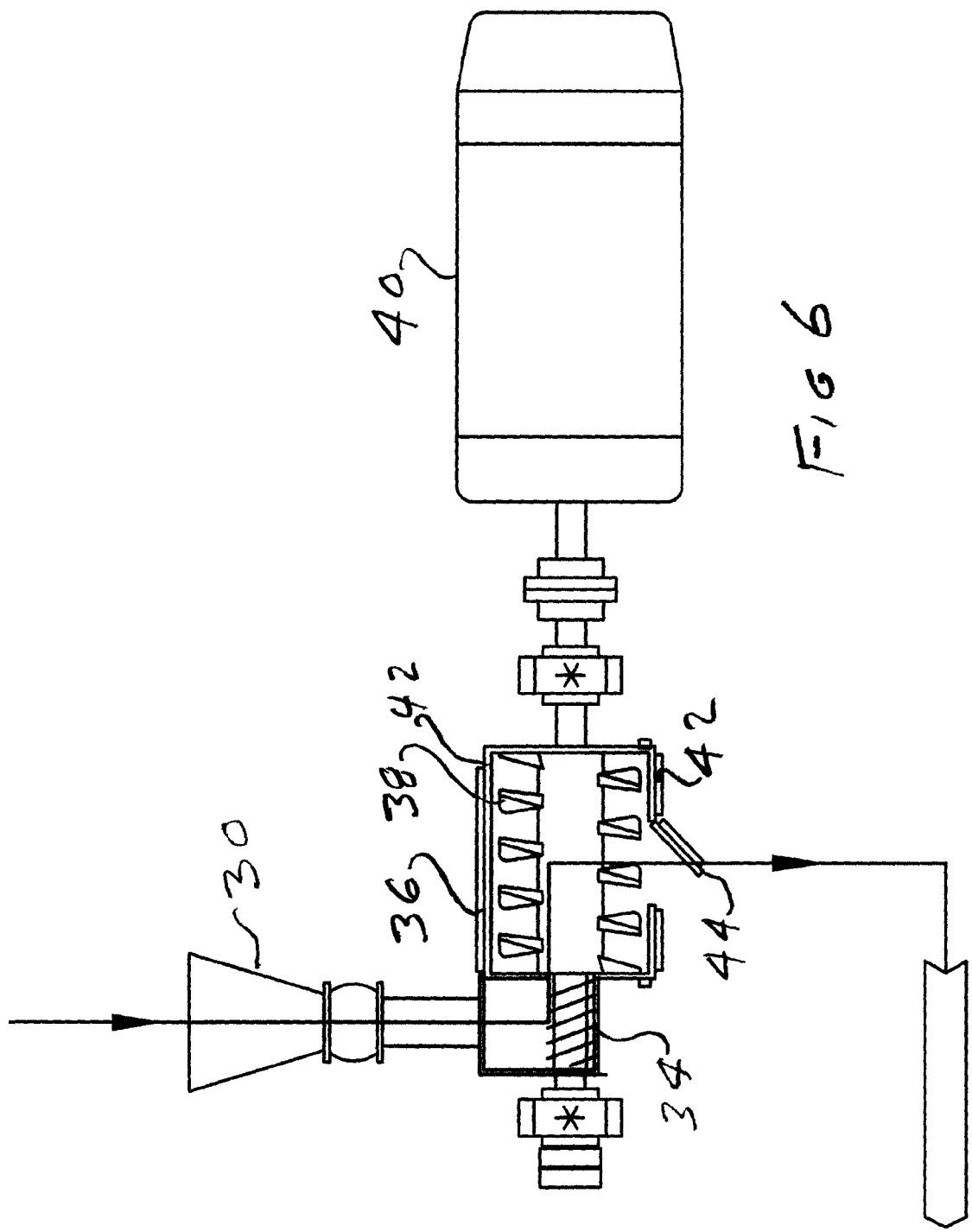
FIG. 6 is a diagram of a mixer.

A mixer 30 is shown in FIG. 6. The mixer 30 has a hopper 32 through which the materials are fed. The materials are carried by a screw feeder 34 into the mixing chamber 36 in which the blades 38 are rapidly rotated by motor 40. The blades 38 rotate through the mix and the centrifugal force created by the blades 38 moves the material outwardly against the mixing chamber wall 42. The frictional heat melts the polymeric materials, the polymer and the compatibilizer, and mixes the fiber with the polymer. After mixing the polymer is removed from the mixing chamber 36 through door 44.

Another method that can be used in the first step is a twin screw extruder with the die plate opened. The twin screw extruder has an open die plate on the exit end so the flow of material from the extruder will not be hindered. The amounts of fiber, polymer and compatibilizer is the same as described for the thermokinetic mixer. The material will exit the twin screw extruder as a lumpy material This material will then be further treated in a pellet mill, such as a California pellet mill, or a single screw extruder, such as a Bonnot single screw extruder.

Figure 7:
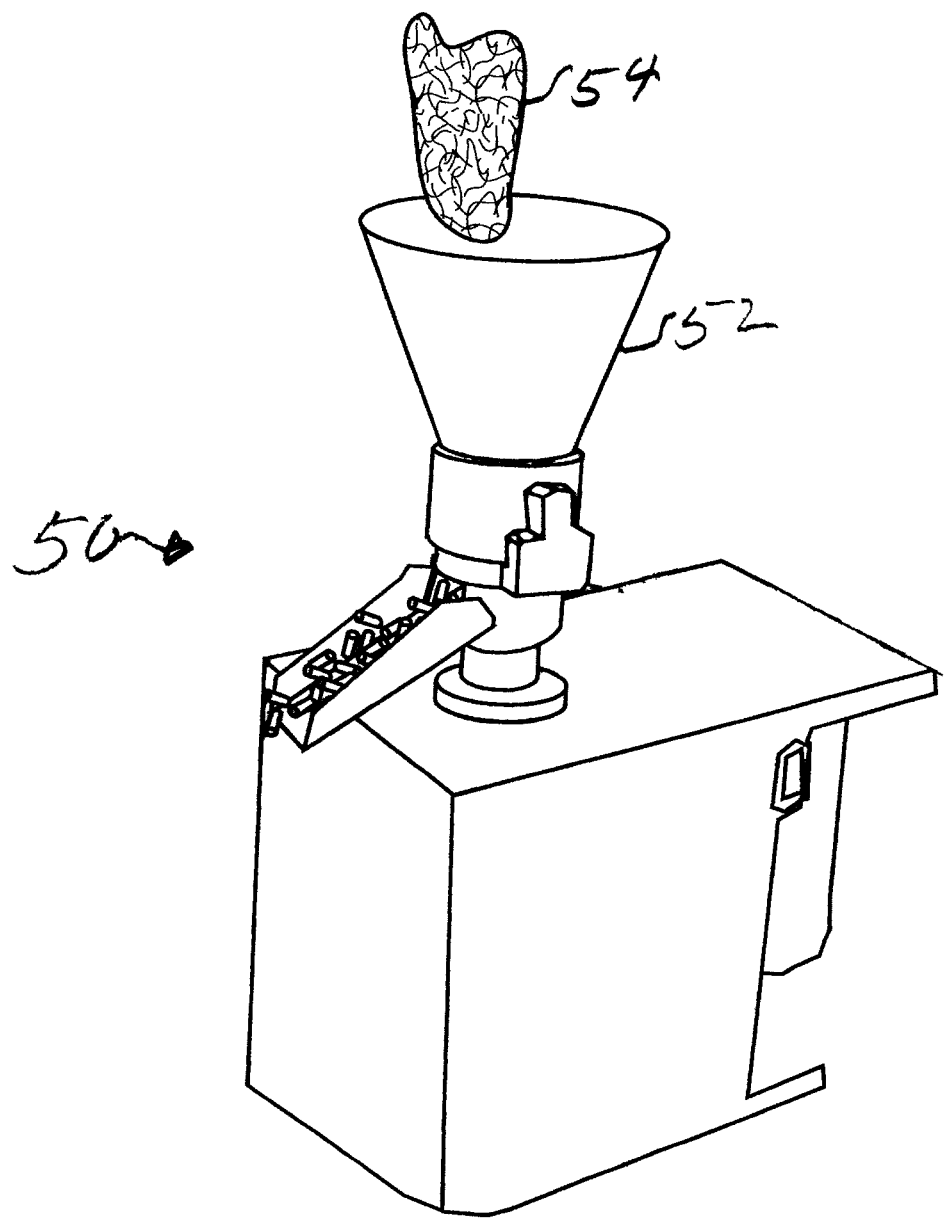
FIGS. 7 and 8 are diagrams of a pellet mill.
Figure 8:
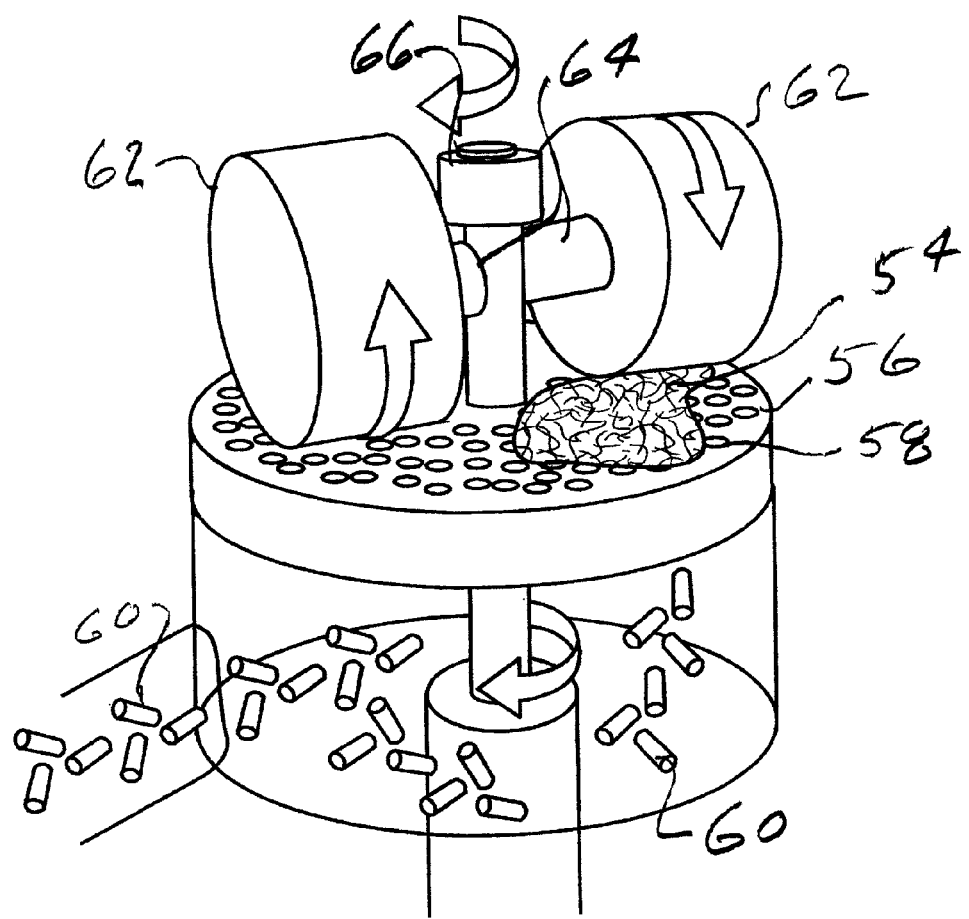

A laboratory version of a pellet mill is shown in FIGS. 7 and 8. The pellet mill 50 has a hopper 52 into which the fiber/polymer composite material 54 from the thermokinetic mixer or twin screw extruder is transferred. The composite material 54 falls onto perforated plate 56. The apertures 58 on perforated plate 56 are the size of the diameter of the extruded pellets 60. A pair of wheels 62 forces the composite through the apertures 58 to form the pellets 60. The wheels 62 are mounted on axles 64. The axles 64 are mounted on a rotor 66. The rotor 66 is rotated by a motor (not shown) to rotate the wheels 62 around the perforated plate 56. The pellets 60 are removed from the apparatus and collected.

It required several experiments to determine how the single screw extruder could be used to provide a material in which the cellulose pulp fiber is dispersed throughout the polymer. The tendency of the fibers at high fiber levels is to clump together. It was discovered that it was necessary to divert the flow of material through the extruder in order to obtain dispersion of the fiber. This is done by the placement of pins extending from the outer wall of the extruder into the extruder cavity. Material is forced from the apparatus through die holes to form extruded pellets. The material may have a tendency to block up behind the die plate and not pass through the die in an efficient manner. The addition of a wiper at the back of the die face move the composite material through the die holes in a more efficient manner.

A single screw extruder is shown in FIG. 9. The extruder 80 has a hopper 82 into which the fiber composite material from the mixer is placed. The hopper 82 connects with a barrel 84 and a screw 86 extending through the barrel 84. The screw 86 is rotated by a motor (not shown) and drives the material in the barrel toward the die plate 88. The design of the screw can put more or less pressure on the composite as it travels through the barrel. Pins 90 are placed along the barrel. The pins 90 may be moved inwardly or outwardly to divert the flow of material through the barrel and aid in the dispersion of the fibers within the polymer The die plate 86 has a number of apertures 92 through which the material passes to form pellets.

In one embodiment the first twin screw mixer may be connected directly to the second single screw extruder and the material will pass directly from the first mixer to the second. The same motor may operate both.

The master batch pellets contain 65 to 90 weight % chemical wood pulp fiber and 15 to 35 weight % polymer.

The invention claimed is:

1. A composition comprising 65 to 90 weight percent kraft bleached chemical wood pulp fibers and a thermoplastic polymer, wherein the composition is in pellet form.

2. The composition of claim 1 wherein the chemical wood pulp fiber has a debonder.

3. The composition of claim 1 wherein the chemical wood pulp fiber has no debonder.

4. The composition of claim 1 further comprising a compatibilizer.

5. The composition of claim 1 further comprising an antioxidant.

6. The composition of claim 1 wherein the amount of chemical wood pulp fibers is 70 to 85 weight percent of the composition.

7. The composition of claim 1 wherein the polymer is not polyvinyl chloride.

8. A method of making a composition comprising
providing kraft bleached chemical wood pulp fibers in the form of a particle to a thermo kinetic mixer,
providing a thermoplastic polymer to the thermo kinetic mixer,
wherein for every 100 weight percent of material provide to the mixer the pulp fibers are 65 to 90 weight percent of the material,
mixing the fiber particles and the polymer in the mixer to form a fiber/polymer blend in which the fibers are dispersed within the polymer,
thereafter forming the fiber/polymer blend into pellets.

9. A method of claim 8 wherein the step of forming the blend into pellets comprises
further mixing the fiber/polymer blend in a second mixing device,
wherein the second mixing device uses split flow to disperse the fibers in the blend, and
thereafter form the blend into pellets.

10. A method of making a composition comprising
providing kraft bleached chemical wood pulp fibers in the form of particles to a first mixing device having at least two intermeshing rotors,
providing a thermoplastic polymer to the first mixing device,
wherein for every 100 weight percent of material provide to the mixer the pulp fibers are 65 to 90 weight percent of the material,
mixing the fiber and the polymer in the first mixing device to form a fiber/polymer blend in which the fibers are dispersed within the polymer,
thereafter forming the fiber/polymer blend into pellets.

11. A method of claim 10 wherein the step of forming the blend into pellets comprises
further mixing the fiber/polymer blend in a second mixing device,
wherein the second mixing device uses split flow to disperse the fibers in the blend, and
thereafter form the blend into pellets.

* * * * *